(12) United States Patent
Gelardi et al.

(10) Patent No.: US 12,039,021 B2
(45) Date of Patent: Jul. 16, 2024

(54) MULTI-LEVEL CLASSIFIER BASED ACCESS CONTROL

(71) Applicant: BRITISH TELECOMMUNICATIONS PUBLIC LIMITED COMPANY, London (GB)

(72) Inventors: Gabriele Gelardi, London (GB); Gery Ducatel, London (GB)

(73) Assignee: BRITISH TELECOMMUNICATIONS PUBLIC LIMITED COMPANY (GB)

( * ) Notice: Subject to any disclaimer, the term of this patent is extended or adjusted under 35 U.S.C. 154(b) by 252 days.

(21) Appl. No.: 17/310,968

(22) PCT Filed: Feb. 28, 2020

(86) PCT No.: PCT/EP2020/055370
§ 371 (c)(1),
(2) Date: Sep. 2, 2021

(87) PCT Pub. No.: WO2020/178209
PCT Pub. Date: Sep. 10, 2020

(65) Prior Publication Data
US 2022/0100829 A1 Mar. 31, 2022

(30) Foreign Application Priority Data
Mar. 7, 2019 (EP) ..................... 19161164

(51) Int. Cl.
*G06F 21/31* (2013.01)
*G06F 21/10* (2013.01)
*G06F 21/45* (2013.01)

(52) U.S. Cl.
CPC ............ *G06F 21/316* (2013.01); *G06F 21/10* (2013.01); *G06F 21/45* (2013.01)

(58) Field of Classification Search
CPC ........ G06F 21/316; G06F 21/45; G06F 21/10; H04W 12/08; H04W 12/68; H04L 2463/082; H04L 63/10
See application file for complete search history.

(56) References Cited

U.S. PATENT DOCUMENTS 8,131,763 B2  3/2012 Tuscano et al.
8,909,297 B2  12/2014 Matas et al.
(Continued)

FOREIGN PATENT DOCUMENTS

AU  2018100672 A4  6/2018
CN  105678125 B  2/2019
(Continued)

OTHER PUBLICATIONS

Aldosary, et al., "A Robust Multimodal Biometric Security System using the Polynomial Curve Technique within Shamir's Secret Sharing Algorithm", Third International Conference on Emerging Security Technologies (EST), sections 1, 2, 2.1, 2012, pp. 66-69.
(Continued)

*Primary Examiner* — Huan V Doan
(74) *Attorney, Agent, or Firm* — Pranger Law PC

(57) ABSTRACT

A computer implemented method of access control for a user device having at least one component for determining behaviors of the user. The method including accessing a first machine learning classifier trained based on at least one prior behavior of the user using the device, the classifier classifying user behavior as compliant or non-compliant. The method further including, in response to a determination that a subsequent behavior is classified as non-compliant, accessing a second machine learning classifier trained based on at least one prior behavior of the user using the device where the prior behavior is classified as non-compliant by the first classifier. The method further including, in response to a determination that the subsequent behavior is classified
(Continued)

as non-compliant by the second classifier, requesting a credential-based authentication of the user and constructively training one of the machine learning classifiers based on the credential-based authentication result.

6 Claims, 8 Drawing Sheets

(56) References Cited

U.S. PATENT DOCUMENTS

| | | | |
|---|---|---|---|
| 9,684,775 | B2 | 6/2017 | Gupta et al. |
| 9,788,203 | B2 | 10/2017 | Dutt et al. |
| 9,817,957 | B1 | 11/2017 | Molina-Markham et al. |
| 9,935,947 | B1 | 4/2018 | Machani |
| 10,055,566 | B2 | 8/2018 | Kwok-Suzuki et al. |
| 10,057,227 | B1 | 8/2018 | Hess et al. |
| 10,063,562 | B1 | 8/2018 | Molina-Markham et al. |
| 10,104,073 | B2 | 10/2018 | Novack et al. |
| 10,140,441 | B2 | 11/2018 | Cheng et al. |
| 10,142,308 | B1 | 11/2018 | Duchin et al. |
| 10,146,922 | B2 | 12/2018 | Guidotti et al. |
| 10,652,238 | B1 | 5/2020 | Edwards et al. |
| 10,693,661 | B1 | 6/2020 | Hamlet |
| 10,778,677 | B1 | 9/2020 | Griffin |
| 11,115,196 | B1 | 9/2021 | Triandopoulos et al. |
| 2002/0162031 | A1 | 10/2002 | Levin et al. |
| 2010/0115610 | A1 | 5/2010 | Tredoux et al. |
| 2012/0137340 | A1 | 5/2012 | Jakobsson et al. |
| 2012/0204035 | A1 | 8/2012 | Camenisch et al. |
| 2013/0097416 | A1 | 4/2013 | Barra et al. |
| 2013/0133055 | A1 | 5/2013 | Ali et al. |
| 2014/0053261 | A1 | 2/2014 | Gupta et al. |
| 2014/0289833 | A1 | 9/2014 | Briceno et al. |
| 2015/0113631 | A1 | 4/2015 | Lerner et al. |
| 2015/0169858 | A1 | 6/2015 | Tg |
| 2015/0178496 | A1 | 6/2015 | Kohlenberg et al. |
| 2015/0371023 | A1 | 12/2015 | Chen et al. |
| 2015/0373051 | A1 | 12/2015 | Dayan et al. |
| 2015/0379253 | A1 | 12/2015 | Cook et al. |
| 2016/0110528 | A1 | 4/2016 | Gupta et al. |
| 2016/0180068 | A1 | 6/2016 | Das et al. |
| 2016/0239649 | A1 | 8/2016 | Zhao |
| 2016/0300049 | A1 | 10/2016 | Guedalia et al. |
| 2016/0366126 | A1* | 12/2016 | Sharifi ............... H04W 12/06 |
| 2017/0024660 | A1 | 1/2017 | Chen et al. |
| 2017/0032113 | A1 | 2/2017 | Tunnell et al. |
| 2017/0109514 | A1 | 4/2017 | Cheng et al. |
| 2017/0177999 | A1 | 6/2017 | Novik et al. |
| 2017/0227995 | A1 | 8/2017 | Lee et al. |
| 2017/0293748 | A1 | 10/2017 | Kurupati |
| 2017/0364673 | A1 | 12/2017 | Gupta et al. |
| 2018/0012003 | A1 | 1/2018 | Asulin et al. |
| 2018/0032709 | A1 | 2/2018 | Martin Perez et al. |
| 2018/0068098 | A1 | 3/2018 | Finzi et al. |
| 2018/0069867 | A1 | 3/2018 | Grajek et al. |
| 2018/0077154 | A1 | 3/2018 | Smith et al. |
| 2018/0097806 | A1 | 4/2018 | Blinn |
| 2018/0107833 | A1 | 4/2018 | Gadepalli et al. |
| 2018/0181741 | A1 | 6/2018 | Whaley |
| 2018/0232504 | A1 | 8/2018 | Bradley et al. |
| 2018/0293367 | A1 | 10/2018 | Urman |
| 2018/0375859 | A1 | 12/2018 | Huh et al. |
| 2019/0005408 | A1 | 1/2019 | Tolpin et al. |
| 2019/0140833 | A1 | 5/2019 | Grajek et al. |
| 2019/0236249 | A1* | 8/2019 | Pavlou ............... G06F 21/554 |
| 2019/0364027 | A1 | 11/2019 | Pande et al. |
| 2020/0125706 | A1 | 4/2020 | Adir et al. |
| 2020/0242232 | A1 | 7/2020 | Machani |
| 2020/0412528 | A1 | 12/2020 | Saint et al. |
| 2021/0076212 | A1 | 3/2021 | Manikantan Shila et al. |
| 2021/0174813 | A1* | 6/2021 | Huh ............... G06N 3/08 |
| 2021/0397683 | A1 | 12/2021 | Liem et al. |
| 2022/0012672 | A1 | 1/2022 | Inman et al. |
| 2022/0164422 | A1 | 5/2022 | Gelardi et al. |

FOREIGN PATENT DOCUMENTS

| | | |
|---|---|---|
| WO | 2012085047 A1 | 6/2012 |
| WO | 2013096944 A1 | 6/2013 |
| WO | 2014179076 A1 | 11/2014 |
| WO | 2014205148 A1 | 12/2014 |
| WO | 2018025019 A1 | 2/2018 |
| WO | 2018048427 A1 | 3/2018 |

OTHER PUBLICATIONS

Antal, et al., "Identity Information Revealed from Mobile Touch Gestures", Studia Universitatis Babes-Bolyai, Informatica, vol. LIX, May 21-25, 2014, pp. 5-14.
Blakley, G. R. "Safeguarding Cryptographic Keys", National Computer Conference, 1979, pp. 313-317.
Bo, et al., "SilentSense: Silent User Identification via Dynamics of Touch and Movement Behavioral Biometrics", in MobiCom, arXiv:1309.0073v1 [cs.CR], Aug. 31, 2013, pp. 1-9.
Buduru, et al., "An Effective Approach to Continuous User Authentication for Touch Screen Smart Devices", IEEE International Conference on Software Quality, Reliability and Security (QRS), 2015, pp. 219-226.
Combined Search and Examination Report under Sections 17 and 18(3) for Great Britain Application No. 1903029.5, dated Sep. 5, 2019, 6 pages.
Combined Search and Examination Report under Sections 17 and 18(3) for Great Britain Application No. 1903030.3, dated Aug. 28, 2019, 6 pages.
Combined Search and Examination Report under Sections 17 and 18(3) for Great Britain Application No. 1903031.1, dated Sep. 9, 2019, 12 pages.
Combined Search and Examination Report under Sections 17 and 18(3) for Great Britain Application No. 1903032.9, dated Sep. 3, 2019, 6 pages.
Combined Search and Examination Report under Sections 17 and 18(3) for Great Britain Application No. 1910169.0, dated Feb. 25, 2020, 10 pages.
Combined Search and Examination Report under Sections 17 and 18(3) for Great Britain Application No. 2019297.7, dated Sep. 1, 2021, 11 pages.
Combined Search and Examination Report under Sections 17 and 18(3) for Great Britain Application No. GB1911314.1 dated Nov. 27, 2019, 7 pages.
Crawford, Heather Anne "A Framework for Continuous, Transparent Authentication on Mobile Devices", PhD thesis, University of Glasgow, 2012, 209 pages.
Crouse, et al., "Continuous Authentication of Mobile User: Fusion of Face Image and Inertial Measurement Unit Data", International Conference on Biometrics (ICB), 2015, pp. 135-142.
Damgard, et al., "Multiparty Computation from Somewhat Homomorphic Encryption", Advances in Cryptology—Crypto 2012, Proceedings of the 32nd Annual Cryptology Conference, Aug. 19-23, 2012, pp. 643-662.
Deutschmann, et al., "Continuous Authentication Using Behavioral Biometrics", Security DARPA, ITPro, Jul./Aug. 2013, pp. 12-15.
Examination Report under section 18(3) for GB Application No. 1910169.0, dated Aug. 13, 2021, 4 pages.
Examination Report under Section 18(3) for Great Britain Application No. GB1911314.1, dated Jan. 25, 2022, 3 pages.
Extended European Search Report for Application No. 19161162.3, dated Jun. 24, 2019, 7 pages.
Extended European Search Report for Application No. 19161165.6, dated Jun. 27, 2019, 7 pages.
Extended European Search Report for Application No. 19161166.4, dated Jun. 27, 2019, 9 pages.
Extended European Search Report for Application No. 19186557.5 dated Nov. 7, 2019, 6 pages.
Extended European Search Report for Application No. 19190589.2, dated Dec. 12, 2019, 9 pages.
Extended European Search Report received for European Patent Application No. 19161163.1 dated Jun. 24, 2019, 7 pages.

(56) References Cited

OTHER PUBLICATIONS

Fathy, et al., "Face-Based Active Authentication on Mobile Devices", IEEE International Conference on Acoustics, Speech and Signal Processing (ICASSP), 2015, pp. 1687-1691.
Feng, et al., "Continuous Mobile Authentication using Touchscreen Gestures", Homeland Security (HST), 2012 IEEE Conference on Technologies for Homeland Security, 2012, pp. 451-456.
Gong, et al., "Forgery-Resistant Touch-based Authentication on Mobile Devices", 11 ACM on Asia Conference on Computer and Communications Security, May 30, 2016-Jun. 3, 2016, 12 pages.
Howells, Professor G. "Security and Privacy for the Internet of Things (Spirit)", EPSRC Research Grant Details, Jan. 1, 2017, 2 pages.
Intego "How to Limit Internet Access by Day and Time with Content Barrier", Retrieved from https://support.intego.com/hc/en-us/articles/207115178-How-to-Limit-Internet-Access-by-Day-and-Time-with-ContentBarrier, Jun. 10, 2019, 5 pages.
International Preliminary Report on Patentability for Application No. PCT/EP2020/055367, dated Sep. 16, 2021, 10 pages.
International Preliminary Report on Patentability for Application No. PCT/EP2020/055369, dated Sep. 16, 2021, 8 pages.
International Preliminary Report on Patentability for Application No. PCT/EP2020/055370, dated Sep. 16, 2021, 11 pages.
International Preliminary Report on Patentability for Application No. PCT/EP2020/055371, dated Sep. 16, 2021, 11 pages.
International Preliminary Report on Patentability for Application No. PCT/EP2020/055372, dated Sep. 16, 2021, 10 pages.
International Preliminary Report on Patentability for Application No. PCT/EP2020/066598 dated Jan. 27, 2022, 8 pages.
International Preliminary Report on Patentability for Application No. PCT/EP2021/083049, dated Jun. 22, 2023, 9 pages.
International Search Report and Written Opinion for Application No. PCT/EP2020/066598, dated Aug. 28, 2020, 11 pages.
International Search Report and Written Opinion for Application No. PCT/EP2020/055369, dated Jun. 9, 2020, 12 pages.
International Search Report and Written Opinion for Application No. PCT/EP2020/055371, dated Mar. 30, 2020, 15 pages.
International Search Report and Written Opinion for Application No. PCT/EP2021/083049, dated Feb. 11, 2022, 14 pages.
International Search Report and Written Opinion for Application No. PCT/EP2020/055372, dated Mar. 30, 2020, 14 pages.
International Search Report and Written Opinion received for PCT Patent Application No. PCT/EP2020/055367, dated Mar. 30, 2020, 14 pages.
Kidslox, Inc. "Parental Control by Kidslox", Google Playstore, Retrieved from the Internet: https://play.google.com/store/apps/details?id=com.kidslox.app&hl=en_IN, Jul. 12, 2019, 4 pages.
Kidslox. "Effectively Limit Child Screen Time With Parental Control App", Retrieved from the Internet: https://kidslox.com, Jul. 12, 2019, 4 pages.
Lee, et al., "Implicit Smartphone User Authentication with Sensors and Contextual Machine Learning", Princeton University, arXiv:1708. 09754v1, Aug. 30, 2017, 13 pages.
Li, et al., "Understanding OSN-Based Facial Disclosure Against Face Authentication Systems", ASIA CCS'14, Jun. 4-6, 2014, pp. 413-423.
Li, et al., "Using Data Augmentation in Continuous Authentication on Smartphones", IEEE Internet of things Journal, vol. 6, No. 1, Feb. 2019, pp. 628-640.
Mondal, et al., "Swipe Gesture based Continuous Authentication for Mobile Devices", International Conference on Biometrics (ICB), Jun. 2015, pp. 458-465.
Office Action received for European Patent Application No. 20706348. 8, dated Jul. 4, 2023, 5 pages.
Office Action received for European Patent Application No. 20706349. 6, dated Jul. 4, 2023, 5 pages.
Office Action received for European Patent Application No. 20706351. 2, dated Jul. 4, 2023, 7 pages.
Office Action received for European Patent Application No. 20706350. 4, dated Jul. 4, 2023, 5 pages.
Ometov, et al., "Multi-factor Authentication: A Survey and Challenges in V2X Applications", 9th International Congress on Ultra Modern Telecommunications and Control Systems and Workshops, Nov. 6, 2017, pp. 129-136.
Rathgeb, et al., "A Survey on Biometric Cryptosystems and Cancelable Biometrics", EURASIP Journal on Information Security, vol. 2011, No. 1, Jan. 1, 2011, 25 pages.
Roy, et al., "An HMM-based Multi-sensor Approach for Continuous Mobile Authentication", Military Communications Conference, MILCOM 2015, Track 3—Cyber Security and Trusted Computing, 2015, pp. 1311-1316.
Saevanee, et al., "Continuous User Authentication using Multimodal Biometrics", Computers and Security, vol. 53, Issue C, Sep. 2015, 20 pages.
Samangouei, et al., "Attribute-based Continuous User Authentication on Mobile Devices", IEEE 7th International Conference on Biometrics Theory, Applications and Systems (BTAS), 2015, 8 pages.
Serwadda, et al., "When Kids' Toys Breach Mobile Phone Security", ACM SIGSAC Conference on Computer and Communications Security (CCS), Nov. 4-8, 2013, pp. 599-610.
Serwadda, et al., "Which Verifiers Work ?: A Benchmark Evaluation of Touch-based Authentication Algorithms", IEEE Sixth International Conference on Biometrics: Theory, Applications and Systems (BTAS),, Sep. 13, 2013, 8 pages.
Shamir, Adi "How to Share a Secret", Communications of the ACM, vol. 22, No. 11, Nov. 1979, pp. 612-613.
Shi, et al., "SenGuard: Passive User Identification on Smartphones Using Multiple Sensors", IEEE 7th International Conference on Wireless and Mobile Computing, Networking and Communications (WiMob), Oct. 2011, pp. 141-148.
Valero, et al., "Improving the Security and QoE in Mobile Devices Through an Intelligent and Adaptive Continuous Authentication System", Sensors, vol. 18, 3769, retrieved from https://www.mdpi.com/1424-8220/18/11/3769, Nov. 4, 2018, 29 pages.
Velten, et al., "User Identity Verification Based on Touchscreen Interaction Analysis in Web Contexts", 11th International Conference on Information Security Practice and Experience, 2015, pp. 268-282.
Wu, et al., "Smartphone Continuous Authentication based on Keystroke and Gesture Profiling", The 49th Annual IEEE International Carnahan Conference on Security Technology, Sep. 21-24, 2015, pp. 191-197.
Xu, et al., "Towards Continuous and Passive Authentication via Touch Biometrics: An Experimental Study on Smartphones", Tenth Symposium on Usable Privacy and Security, Jul. 9-11, 2014, pp. 187-198.
Yampolskiy, et al., "Behavioural Biometrics: a Survey and Classification", International Journal of Biometrics, vol. 1, No. 1, 2008, pp. 81-113.
Zhang, et al., "Robust Multimodal Recognition via Multitask Multivariate Low-Rank Representations", IEEE International Conference on Automatic Face and Gesture Recognition, 2015, 8 pages.
Zhang, et al., "Touch Gesture-Based Active User Authentication Using Dictionaries", IEEE Winter Conference on Applications of Computer Vision, Waikoloa, 2015, pp. 207-214.
Combined Search and Examination Report under Sections 17 and 18(3) for Great Britain Application No. GB1903033.7, dated Sep. 9, 2019, 9 pages.
Extended European Search Report for Application No. 19161164.9, dated Jun. 26, 2019, 9 pages.
Frank M., et al., "Touchalytics: On the Applicability of Touchscreen Input as a Behavioral Biometric for Continuous Authentication," Jan. 2013, IEEE Transactions on Information Forensics and Security, vol. 8, No. 1, XP011484631, ISSN: 1556-6013, DOI:10. 1109/TIFS. 2012 .2225048, 13 pages.
International Search Report and Written Opinion for Application No. PCT/EP2020/055370, dated Mar. 30, 2020, 15 pages.

* cited by examiner

US 12,039,021 B2

MULTI-LEVEL CLASSIFIER BASED ACCESS CONTROL

PRIORITY CLAIM

The present application is a National Phase entry of PCT Application No. PCT/EP2020/055370, filed Feb. 28, 2020, which claims priority from EP Patent Application No. 19161164.9, filed Mar. 7, 2019, each of which is hereby fully incorporated herein by reference.

FIELD

The present disclosure relates generally to access control for a user device.

BACKGROUND

User devices such as portable computing devices, tablet computers, smartphones, mobile terminals and the like are increasingly mobile and pervasive. Access control security measures for such devices typically involve a password, codeword, numeric or pattern-based lock or employ biometrics such as fingerprint or facial recognition. However, once access is gained to a device, the access is typically persistent while the device is in-use or at least until some expiry condition. Accordingly, accessing an unlocked device provides access to the device limited recourse to access control mechanisms.

Thus, there is a challenge in providing access control for user devices that address and/or mitigate these challenges.

SUMMARY

According to a first aspect of the present disclosure, there is a provided a computer implemented method of access control for a user device having at least one component for determining behaviors of the user, the method comprising: accessing a first machine learning classifier trained based on at least one prior behavior of the user using the device, the classifier classifying user behavior as compliant or non-compliant such that compliant behavior is determined by the first classifier to be consistent with prior behavior for permitting access to the device; and responsive to a determination that a subsequent behavior is classified as non-compliant, accessing a second machine learning classifier trained based on at least one prior behavior of the user using the device where the prior behavior is classified as non-compliant by the first classifier, the second classifier classifying user behavior as compliant or non-compliant such that compliant behavior is determined by the second classifier to be consistent with prior behavior for permitting access to the device in the event of non-compliant classification by the first classifier, and further responsive to the determination performing the operations of: a) responsive to a determination that the subsequent behavior is classified as non-compliant by the second classifier: i. requesting a credential-based authentication of the user; ii. constructively training the second machine learning classifier based on the subsequent behavior and a result of the credential-based authentication by providing the subsequent behavior as an additional training example for the second classifier; and iii. permitting access to the device in response to the credential-based authentication; responsive to a determination that the subsequent behavior is classified by the first classifier as compliant, constructively training the first classifier based on the subsequent behavior as a compliant behavior by providing the subsequent behavior as an additional training example for the first classifier.

In embodiments, the method further comprises, responsive to a determination that the subsequent behavior is classified by the first classifier as non-compliant, constructively training the classifier based on the subsequent behavior as a non-compliant behavior by providing the subsequent behavior as an additional training example for the first classifier.

In embodiments, the component is one or more of: a location sensor; a position sensor; an orientation sensor; an accelerometer; an input device; a touch-screen; a temperature sensor; a time determiner; a pressure sensor; an olfactory sensor; a chemical sensor; a biometric sensor; a heart rate sensor; a cardiogram generator; a sound sensor; a voice recognition component; a handwriting recognition component; a global positioning system; and a gyroscope.

In embodiments, the credential-based authentication includes one or more of: an authentication scheme using a user identifier and password; a key-based user authentication scheme; a token-based user authentication scheme; and a multi-factor authentication scheme in which authentication is requested via a different device.

According to a second aspect of the present disclosure, there is a provided a computer system including a processor and memory storing computer program code for performing the steps of the method set out above.

According to a third aspect of the present disclosure, there is a provided a computer system including a processor and memory storing computer program code for performing the steps of the method set out above.

BRIEF DESCRIPTION OF DRAWINGS

Embodiments of the present disclosure will now be described, by way of example only, with reference to the accompanying drawings, in which.

DETAILED DESCRIPTION

Figure 1:
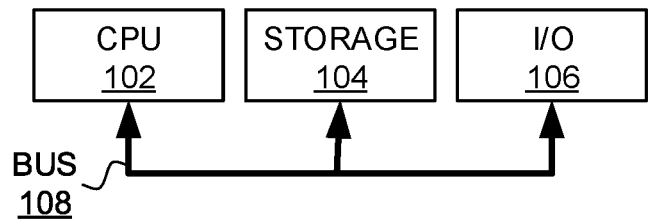
FIG. 1 is a block diagram a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random-access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
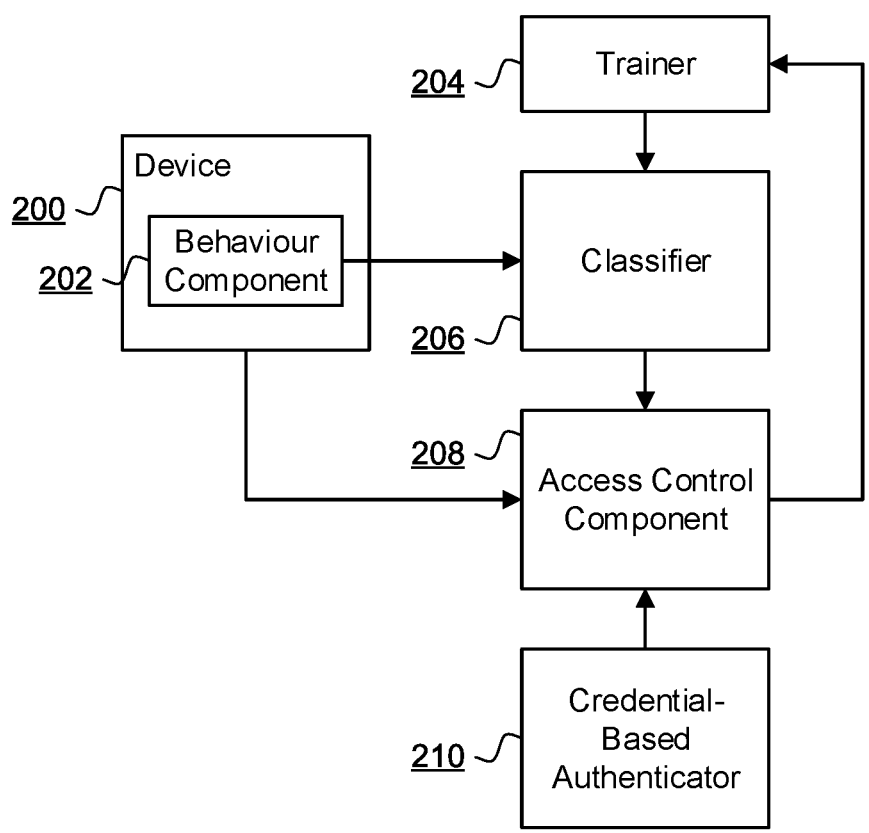
FIG. 2 is a component diagram of an arrangement for access control for a user device according to an embodiment of the present disclosure.

FIG. 2 is a component diagram of an arrangement for access control for a user device 200 according to an embodiment of the present disclosure. The user device 200 is a computing device such as a portable computing device, tablet computer, smartphone, mobile terminal, gaming device, in-vehicle information system, in-vehicle control device, medical device, communications device, entertainment device or other device as will be apparent to those skilled in the art and as may be conceived even after the relevant date of the present application. The user device 200 is used by at least one user in a manner that constitutes user behavior. Such behaviors can include, by way of example only and inter alia: a particular holding, handling, orientation and/or movement of the device 200; a rotation, degree of pressure, speed of interaction, frequency of interaction of the device 200; a location, position, relative location, speed, velocity or altitude of the device; an environmental characteristic, temperature, humidity or pressure of the device; the use of a particular hand, finger, limp, facial feature to handle, hold or interact with the device; particular biometric characteristics of the user using the device; characteristics of use of the device including particular user interaction behaviors such as user interface gestures, characteristic interactions, swipes, button presses, style of interaction, pressure of interaction; and other behavioral characteristics as will be apparent to those skilled in the art. Notably, certain of the exemplary behaviors are described in terms characteristics of a user, an environment, the device or interaction therebetween and these are considered to constitute behaviors of the user who, for example, places the device in such environment, or interacts using such user characteristics.

The device 200 includes at least one behavior component 202 as a hardware, software, firmware or combination component adapted to determine a behavior of a user of the device 200. For example, the behavior component 202 can include one or more of, inter alia: a location sensor; a position sensor; an orientation sensor; an accelerometer; an input device; a touch-screen; a temperature sensor; a time determiner; a pressure sensor; an olfactory sensor; a chemical sensor; a biometric sensor; a heart rate sensor; a cardiogram generator; a sound sensor; a voice recognition component; a handwriting recognition component; a global positioning system; a gyroscope; and other behavior components as will be apparent to those skilled in the art.

An access control component 208 is provided as a hardware, software, firmware or combination component for providing access control for the device 200. Access control includes determining, for a user seeking to access or accessing the device 200, whether the user's access is authorized and providing or continuing access for such user, or alternatively whether the user's access is not authorized and preventing access for such user. Preventing access can include, for example, locking, powering off, disabling or otherwise securing the device 200 from use by the unauthorized user.

The access control component 208 is arranged to perform access control interventions for the device 200 by which access to the device 200 by a user is granted or prevented, the interventions being triggered according to one or more predetermined rules. In one embodiment, the access control component 208 is configured to undertake continuous authentication of a user such that access control is implemented on a regular, routine or substantially continuous basis, such as, for example, inter alia: every predetermined period of time according to a particular frequency; whenever a particular operation or class of operation is performed by the device 200 such as opening an application, performing a data transfer, accessing a screen or the like; on the basis of a stochastic variable such that authentication is triggered periodically stochastically; or on some other continuous, regular or similar basis as will be apparent to those skilled in the art.

The access control component 208 is operable with a classifier 206 constituted as a machine learning algorithm such as, by way of example: a perceptron classifier; a naive Bayes classifier; a decision tree classifier; a logistic regression classifier; a k-nearest neighbor classifier; an artificial neural network or deep learning classifier; a support vector machine or other classifier as will be apparent to those skilled in the art. The classifier is trained by a trainer 204 as a software, hardware, firmware or combination component adapted to undertake training of the classifier 206 based on training examples. In particular, the classifier 206 is trained based on behavior of a user (or, conceivably, multiple users) of the device 200 determined by the behavior component 202 such that the classifier is able to classify subsequent user behavior as either compliant with training examples for an authorized user or non-compliant. Notably, a classification of non-compliance is a classification that behavior is not consistent with behavior of an authorized user as learned by the classifier 206. In some embodiments, the classifier 206 can be further trained with training examples including behavior of non-authorised users such that the determination of non-compliance by way of the classifier 206 can also be effected as a consistency of behavior with the training examples for non-authorised users. Accordingly, the trainer 204 initially trains the classifier 206 with at least one prior behavior of an authorized user, each training example including a characterisation of a behavior and, in some embodiments, an indication of whether such behavior related to an authorized or un-authorised user. Behavior characteristics can be encoded for use in training and sampling the classifier 206 using any suitable method such as a one-hot or multi-hot vector encoding.

Thus, in use, the access control component 208 provides a determination of whether a user of the device 200 is authorized to access the device based on behavior characteristics received from the behavior component 202 and with reference to the classifier 206. According to embodiments of the present disclosure, the access control component 208 is further adapted to trigger or perform additional training of the classifier 206 responsive to at least positive authentications of a user accessing the device 200 so as to further improve a model, data structure, neural network or other machine learning construct of the classifier 206 and, therefore, the suitability of the classifier 206 for classifying user behaviors as compliant (for authorization) or non-compliant (for non-authorization). Thus, on determination of at least a positive authorization of a user based on a behavior classification for the user, the access control component 208 formulates a new training example including the user's behavior and, depending on the machine learning approach, its classification as a compliant behavior, and triggers the trainer 204 to perform a further training process of the classifier using such new training example, such further training being additional to all prior training of the classifier 206. Thus, the classifier 206 is constructively trained in that it is trained additionally to its existing training so as to progressively improve the suitability of the classifier 206.

Where user behavior is classified by the classifier 206 as non-compliant, the access control component 208 is arranged to invoke a credential-based authenticator 210 to confirm a state of authorization for the user. The credential-based authenticator 210 is a hardware, software, firmware or combination component for authenticating a user's authorization to access the device 200 based on credential and/or challenge responses of the user. For example, a credential-based authentication scheme can include, inter alia: an authentication scheme using a user identifier and password; a key-based user authentication scheme; a token-based user authentication scheme; a multi-factor authentication scheme in which authentication is requested via a different device, and other credential-based authentication schemes as will be apparent to those skilled in the art. The premise of a credential-based authentication scheme is that an ability to present authorized credentials or suitably respond to an authentication challenge serves to confirm a state of authorization to access the device 200. Thus, the credential-based authentication scheme is used as a definitive confirmation of a state of authorization of a user. Thus, a user exhibiting behavior classified by the classifier 206 as non-compliant but nonetheless able to successfully authenticate using the credential-based authentication scheme is permitted to access the device 200 by the access control component 208. Furthermore, such a user exhibiting behavior classified as non-compliant and nonetheless being permitted access to the device 200 based on the credential-based authentication scheme is used by the access control component 208 to generate a new training example for the classifier 206. Such new training example is used to constructively train the classifier 206 in the manner previously described so as to improve the suitability of the classifier to classify behavior such as that which was previously classified as non-compliant but which was nonetheless determined to be behavior of an authorized user based on the credential-based authentication scheme. Notably, the new training example in the case of a user authenticated by a credential-based authentication scheme, will include the behavior of the user and the credential-based authentication outcome: i.e., that the user is authorized and, thus, should be deemed compliant in the classifier.

Where user behavior is classified by the classifier 206 as non-compliant and the user fails to successfully authenticate using the credential-based authentication scheme, access to the device for the user is prevented. In this way, unauthorized users are prevented from accessing the device 200. In embodiments, the access control component 208 is further adapted to trigger or perform additional training of the classifier 206 responsive also to negative authentications of a user accessing the device 200 so as to further improve a model, data structure, neural network or other machine learning construct of the classifier 206 and, therefore, the suitability of the classifier 206 for classifying user behaviors as compliant (for authorization) or non-compliant (for non-authorization). That is, where a user is found to be non-compliant based on the classifier 206 and the user fails to authenticate using the credential-based authentication scheme, the behavior of such user can be used to reinforce the non-compliance in the classifier 206 by a further training example generated from the behavior and the non-authorized status of the user.

In this way, the classifier 206 is progressively improved through constructive training during repeated authentication processes.

It will be appreciated that, while the access control component 208, the classifier 206, the trainer 204 and the credential-based authenticator 210 are illustrated in FIG. 2 (and other Figures) as being separate from the device 200, any or all of these components can be included in, integrated with, provided by, stored in and/or executed by the user device 200. In an embodiment, all of these components are provided as services, facilities or features of the device 200 such that the device 200 is operable to perform access control without external assistance. In alternative embodiments, any of the components 204 to 210 may be provided by a separate computer system such as a network connected computer system accessible to the device 200 by way of a communications network, such as by secure network communication using encryption. Furthermore, any of components 204 to 210 can be provided as cloud based or virtual services. The same appreciations are applied to the other embodiments described with respect to FIGS. 4 to 11.

Figure 3:
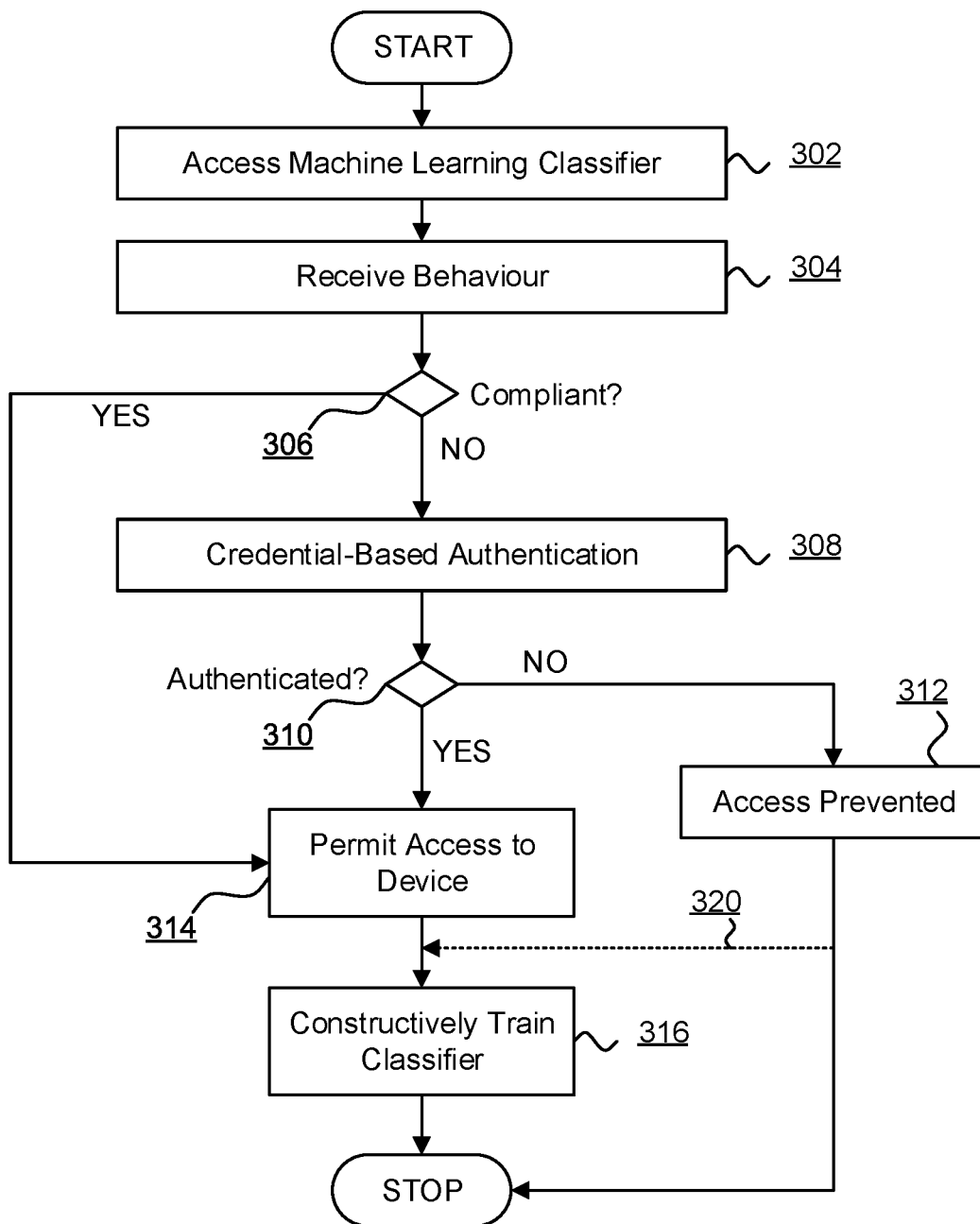
FIG. 3 is a flowchart of a method of access control according to an embodiment of the present disclosure.

FIG. 3 is a flowchart of a method of access control according to an embodiment of the present disclosure. Initially, at 302, the access control component 208 accesses the machine learning classifier 206 that is trained based on at least one prior behavior of a user using the device. At 304 the access control component 208 receives a subsequent behavior of a user and determines, at 306, if the subsequent behavior is compliant by classifying the subsequent behavior using the classifier 206. If the classifier 206 classifies the behavior as compliant the method proceeds to 314. Otherwise, the method proceeds to 308. At 308 the access control component 208 employs a credential-based authentication scheme by way of the credential-based authenticator 210 to authenticate the user. If the user fails to authenticate by the credential-based authentication at 310 the method proceeds to 312 where access to the device is prevented or ceased. Alternatively, if the method determines, at 310, that the user successfully authenticates by the credential-based authentication, the method proceeds to 314.

314 is arrived at either from 306 in the event of a compliant classification of user behavior, or from 310 in the event of successful authentication of the user by the credential-based authentication scheme. At 314 the access control component 208 permits the user access to the device 200. At 316, the access control component 208 generates a new training example for the trainer 204 to constructively train the classifier 206, the training example being based on the subsequent user behavior and the appropriate authentication outcome. Notably, the appropriate authentication outcome for users authorized by way of compliant classification or authenticated by way of the credential-based authentication scheme is "authorized" (or "compliant"), even if (in the event of credential-based authorized users) the original classification for the user was non-compliant.

As previously described, in the event of non-compliant behavior of a user that further fails to authenticate by way of the credential-based authentication scheme, access is prevented as 312. In some embodiments, the behavior, non-compliant and non-authorized state of such a user is additionally used as a new training example at 316 to constructively train the classifier 206. This serves to improve the classifier's suitability in respect of non-authorized users. This optional operation from 312 is indicated by a broken line in FIG. 3.

Figure 4:
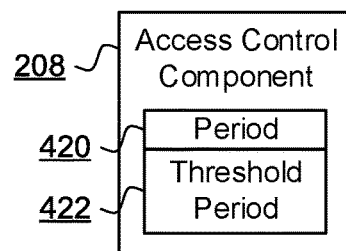
FIG. 4 is an alternative arrangement of the access control component of FIG. 2 in accordance with an embodiment of the present disclosure.

FIG. 4 is an alternative arrangement of the access control component 208 of FIG. 2 in accordance with an embodiment of the present disclosure. Notably, the access control component 208 of FIG. 4 is identical to, and used in the same arrangement as, that described with respect to FIG. 2 except for differences described below.

The access control component 208 includes a period 420 as a variable, parameter or other suitable data item for storing an indication of a period since a most recent compliant behavior of a user occurred. Notably, the period can be a time period measured in, for example, seconds, minutes and/or hours. Thus, the period can be recorded as a time of a most recent compliant behavior such that a period since such time can be readily evaluated. Alternatively, the period can be a measure of a number of authentication attempts that have occurred resulting in non-compliance. For example, the period can be a measure of a number of occasions when access to the device 200 is prevented based on non-compliant behavior.

The access control component 208 further includes a threshold period 422 as a predefined size, length or value of a period (whether measured in terms of, for example, time or non-compliant behavior classifications), beyond which access to the device 200 is to be prevented. In use, the access control component 208 of FIG. 4 operates in substantially the same way as that of FIG. 2 except that non-compliant behavior (as determined by the classifier 206) does not lead to credential-based authentication and potential access prevention until a period 420 since a most recent compliant behavior meets or exceeds the threshold period 422. Thus, in this way, the access control component 208 can be seen to be permissive in the event of non-compliant behavior for a predetermined period up to the threshold period 422. Such a permissive approach to authentication is useful, for example, for non-critical devices, services or resources such as subscription resources where non-compliance indicates non-subscription (e.g. a user has not paid to use the device 200) but cessation of access can be postponed for a period (the threshold period 422) in the event that behavior transitions to compliant behavior. A tangible example of the usefulness of such an approach can be seen in the event that an authorized user of the device 200 (e.g. a paid-up subscriber) hands the device to a third party briefly for demonstration purposes. The third party is not a paid-up subscriber and is not an authorized user. The third party behaviors will be classified as non-compliant, but for the period up to the threshold period 422 access is not prevented such that the third party can utilize the device within the period. Once the threshold period is reached then the access control component 208 reverts to the approach described with respect to FIG. 2 in which a credential-based authentication scheme is invoked.

Figure 5:
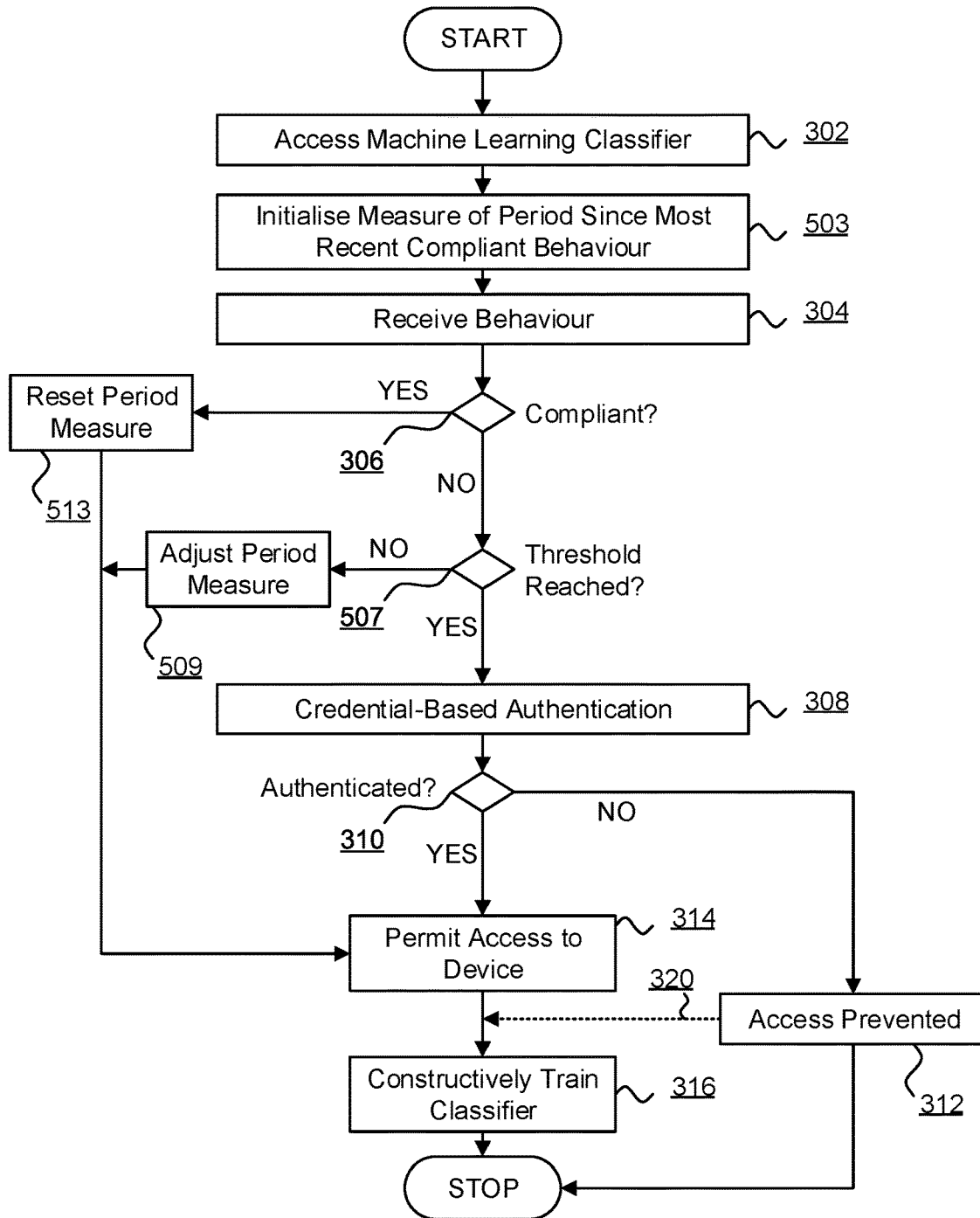
FIG. 5 is a flowchart of a permissive access control mechanism for a user device according to an embodiment of the present disclosure.

FIG. 5 is a flowchart of a permissive access control mechanism for a user device 200 according to an embodiment of the present disclosure. Many of the operations of FIG. 5 are identical to those described above with respect to FIG. 3 and a description of these will not be repeated here. Where FIG. 5 differs from FIG. 3, FIG. 5 additionally includes 503 following 302 at which the measure of a period 420 since a most recent compliant behavior is initialized, for example, by setting the period 420 to zero or, in the case of a period measured in time, setting the period 420 to a current or predetermined time. Further, in FIG. 5, where a user behavior is classified as compliant at 306, the method proceeds to reset the period since most recent compliant behavior at 513, for example by setting the period 420 to zero or, in the case of a period measured in time, setting the period 420 to a current time. In FIG. 5, where a user behavior is classified as non-compliant at 306, the method proceeds to 507 where the access control component 208 determines if the threshold period 422 is reached. This can be achieved by a comparison between the period 420 and the threshold 422. While the threshold is not reached the method proceeds to 509 where the period measure 420 is adjusted by, for example, incrementing it or updating it to indicate an increase in the time since a most recent compliant behavior. Subsequently, 509 leads to 314 where access to the device is permitted while the threshold is not reached. Where the threshold period is determined to be reached at 507, the method proceeds to 308 where credential-based authentication is performed as described above with respect to FIG. 3. All other operations of FIG. 5 are as previously described with respect to FIG. 3.

Figure 6:
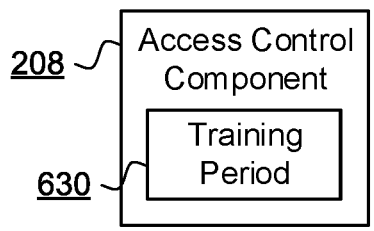
FIG. 6 is an alternative arrangement of the access control component of FIG. 2 in accordance with an embodiment of the present disclosure.

FIG. 6 is an alternative arrangement of the access control component 208 of FIG. 2 in accordance with an embodiment of the present disclosure. Notably, the access control component 208 of FIG. 6 is identical to, and used in the same arrangement as, that described previously with respect to FIG. 2 and/or FIG. 4 except for differences described below.

Figure 7:
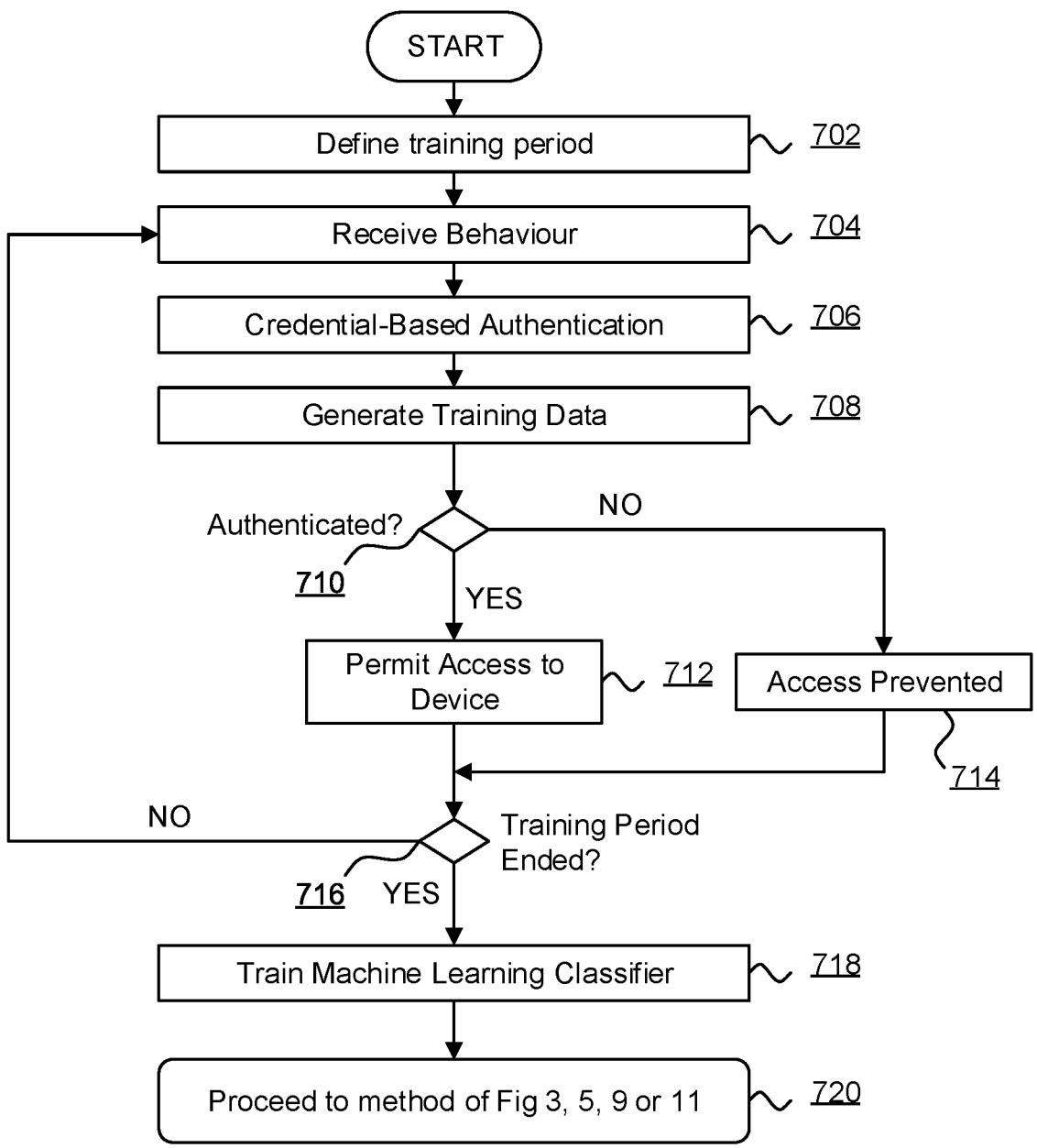
FIG. 7 is a flowchart of a method of training a classifier for use with the embodiments of FIGS. 3, 5, 9 and/or 11 in accordance with an embodiment of the present disclosure.

The access control component 208 of FIG. 6 is adapted for initial training of the classifier 206 such that the classifier 206 is suitable for classifying behavior of a user as compliant or non-compliant as indicative of authorized and non-authorized users respectively. Notable, access control component 208 as will be described here with reference to FIGS. 6 and 7 is used to undertake or trigger initial training of the classifier 206. This initial training is required for a classifier 206 that is as yet untrained or not sufficiently trained for the purpose of use in the arrangements of, for example, FIGS. 2, 3, 4 and 5. Thus, the training triggered or performed by the access control component 208 during the authentication process of, for example, FIGS. 3 and 5, is the same as previously described. The initial training provided by the access control component 208 here and with respect to FIGS. 6 and 7 is additional to this.

The access control component 208 of FIG. 6 further includes a training period 630 variable, parameter or other suitable data item. The training period 630 is a predetermined indication of a period during which training of the classifier 206 is performed and during which all authentication of users to access the device 200 is performed using the credential-based authenticator 210 as previously described. The training period 630 can be constituted as, for example, a time period, a duration, a number of training examples, a number of authentication attempts or other suitable definition of a period for training as will be apparent to those skilled in the art. In use, the access control component 208 determines if an authentication is to take place within the training period 630 and, if so, performs a credential-based authentication process to authenticate a user. Behavior information is nonetheless received by the access control component 208 and is used along with the result of the credential-based authentication process to generate training data as training examples for training the classifier 206 by the trainer 204. Notably, training examples are generated for both authenticated users (such examples including the user behavior and compliant state), and non-authenticated users (such examples including the user behavior and non-compliant state). Once the training period 630 has ended, passed or otherwise expired then the training examples are used to train the classifier 206 such that the classifier 206 is suitable for use in methods of behavioral authentication such as those described with respect to FIG. 3, 5, 9 or 11.

Figure 9:
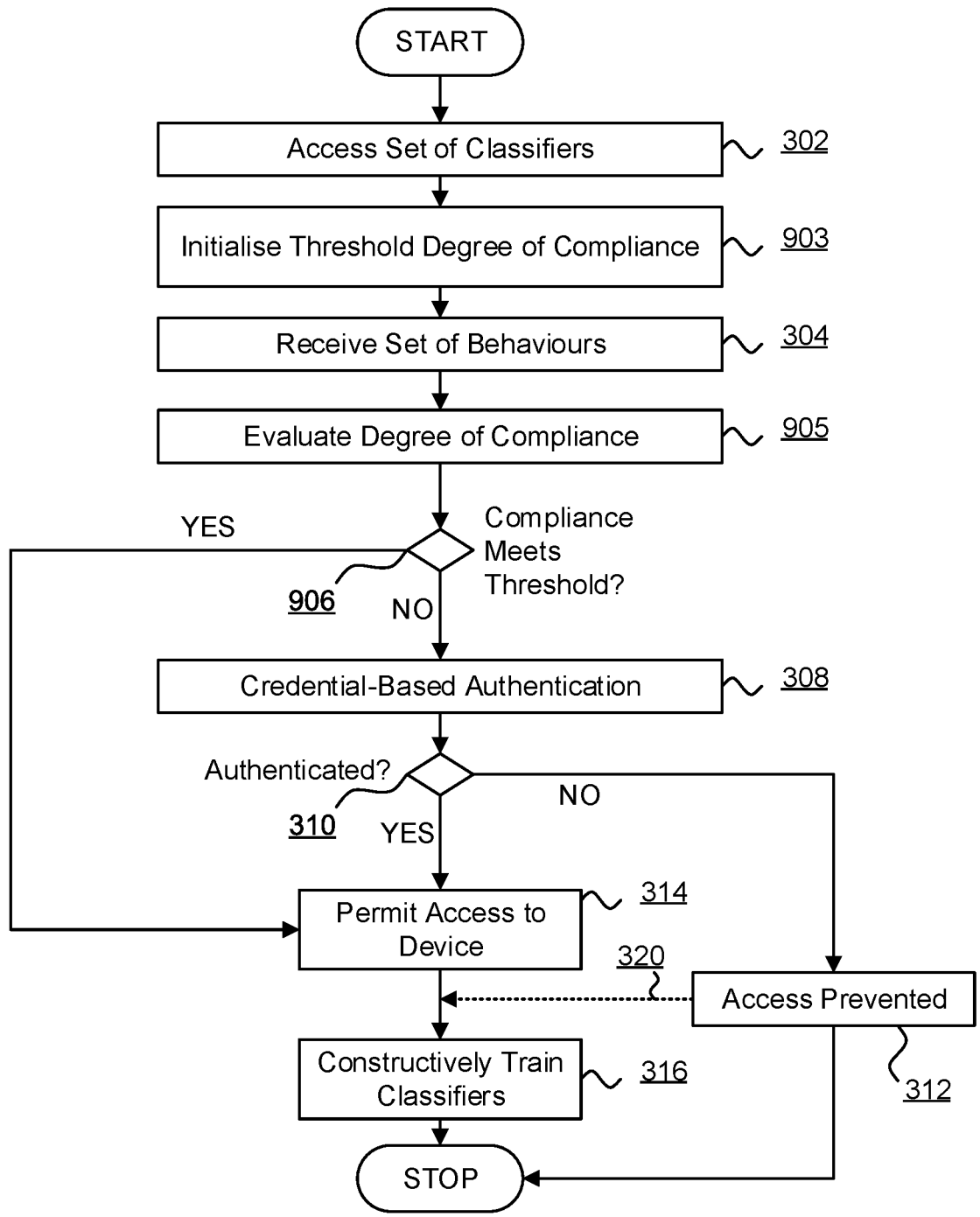
FIG. 9 is a flowchart of a method of access control for the embodiment of FIG. 8 in accordance with an embodiment of the present disclosure.

FIG. 7 is a flowchart of a method of training a classifier 206 for use with the embodiments of FIGS. 3, 5, 9 and/or 11 in accordance with an embodiment of the present disclosure. Initially, at 702, the training period 630 is defined. At 704 user behavior for a user is received from the behavior component 202. At 706 a credential-based authentication scheme is used to determine a state of authentication of the user—either authorized or non-authorized. At 708, a new training example is generated as training data for the classifier 206 based on the received behavior information and the state of authorization for the user. At 710, 712 and 714 access to the device is permitted or prevented in dependence on the state of authentication of the user based on the credential-based authentication scheme. At 716 the method determines if the training period has ended and loops to 704 until the training period has ended. Once the training period ends the method proceeds to 718 where the access control component 208 undertakes or triggers training of the classifier 206 by the trainer 204 based on the training examples generated at iterated 708. Subsequently, the trained classifier 206 is used in methods of behavioral authentication such as those described with respect to FIG. 3, 5, 9 or 11.

Figure 8:
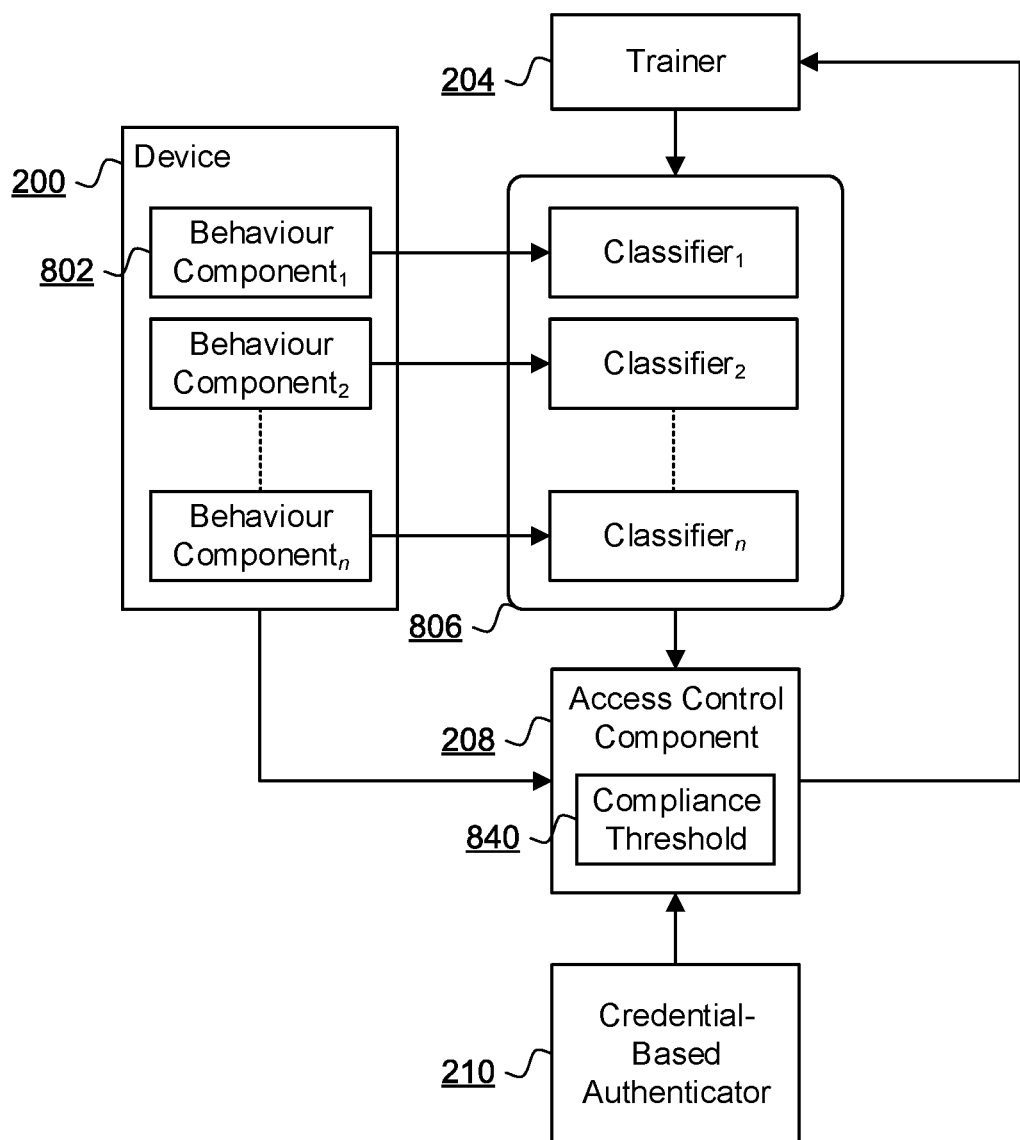
FIG. 8 is a component diagram of an arrangement for behavior-based access control for a user device according to an embodiment of the present disclosure.

FIG. 8 is a component diagram of an arrangement for behavior-based access control for a user device 200 according to an embodiment of the present disclosure. Many of the elements of FIG. 8 are identical to those described above with respect to FIG. 2 and these will not be repeated here. The device 200 of FIG. 8 includes a plurality of behavior components 802 each adapted to provide different behavior information for a user of the device. For example, each behavior component 802 can constitute a different sensor or set of sensors for determining behavior of a user. Further, in FIG. 8 multiple classifiers 806 are provided, each corresponding to a behavior component 802 of the device. While each of the classifiers 806 acts substantially as previously described with respect to FIGS. 1 to 7, the multiplicity of classifiers 806 is such as to provide a classifier for each different behavior information received from the different multiple behavior components 802. Thus, for example: a location sensor behavior component can have associated a classifier for classifying location information; a user gesture behavior component can have associated a classifier for classifying user gestures; and so on.

Further, the access control component 208 of FIG. 8 includes a predetermined compliance threshold 840 as a parameter, variable or other data item for determining a strength, confidence or other degree of compliance of all classifiers 806 in aggregate required in order to authenticate a user and provide access to the device 200. Thus, in use, each classifier 806 classifies behavior information from the behavior components 802 as previously described in order to determine a classification as either compliant or non-compliant. Furthermore, each classifier is operable to provide a strength, confidence or other degree of membership of received behavior with its determined classification such that a degree of membership of behavior with a compliant or non-compliant classification is provided. Such a degree of membership can be provided as, for example, a weight of connections in a neural network leading to the classification outcome, a confidence measure of the classifier, or other suitable measure of a degree of membership of behavior with a classification. For example, state vector machines can allow the retrieval of classification confidence on which basis a prediction classification is generated. Alternatively, a classifier 806 that provides a probabilistic score for its classifications, such as logistic regression classifiers, can be used whereby the score can constitute such degree of membership.

The degree of membership of each classifier for behaviors of a user are aggregated such as by statistical average, summation, or other suitable means. Thus, a degree of compliance of a user is evaluated. This degree of compliance is compared with the compliance threshold 840 and only where the threshold degree is met will compliance of a user be determined for the purpose of permitting access to the device. Non-compliance can result in the use of a credential-based authentication scheme as previously described.

FIG. 9 is a flowchart of a method of access control for the embodiment of FIG. 8 in accordance with an embodiment of the present disclosure. Many of the operations of FIG. 9 are identical to those described previously with respect to FIG. 2 and these will not be repeated here. FIG. 9 additionally includes, after 302, new operation 903 in which the threshold degree of compliance 840 is initialized to a predetermined threshold degree. Subsequently, after receipt of a set of behaviors 304 from the behavior components 802, the method evaluates a degree of compliance at 905 on aggregate for all behaviors based on the classifiers 206 for the behaviors. At 906 the method determines if the degree of compliance meets the threshold degree 840 and, if the threshold is met, the method proceeds to 314 where access to the device is permitted. Alternatively, if the threshold is not met, the method proceeds to 308 where a credential-based authentication scheme is employed. All other operations of the method of FIG. 9 are identical to those described with respect to FIG. 2.

Figure 10:
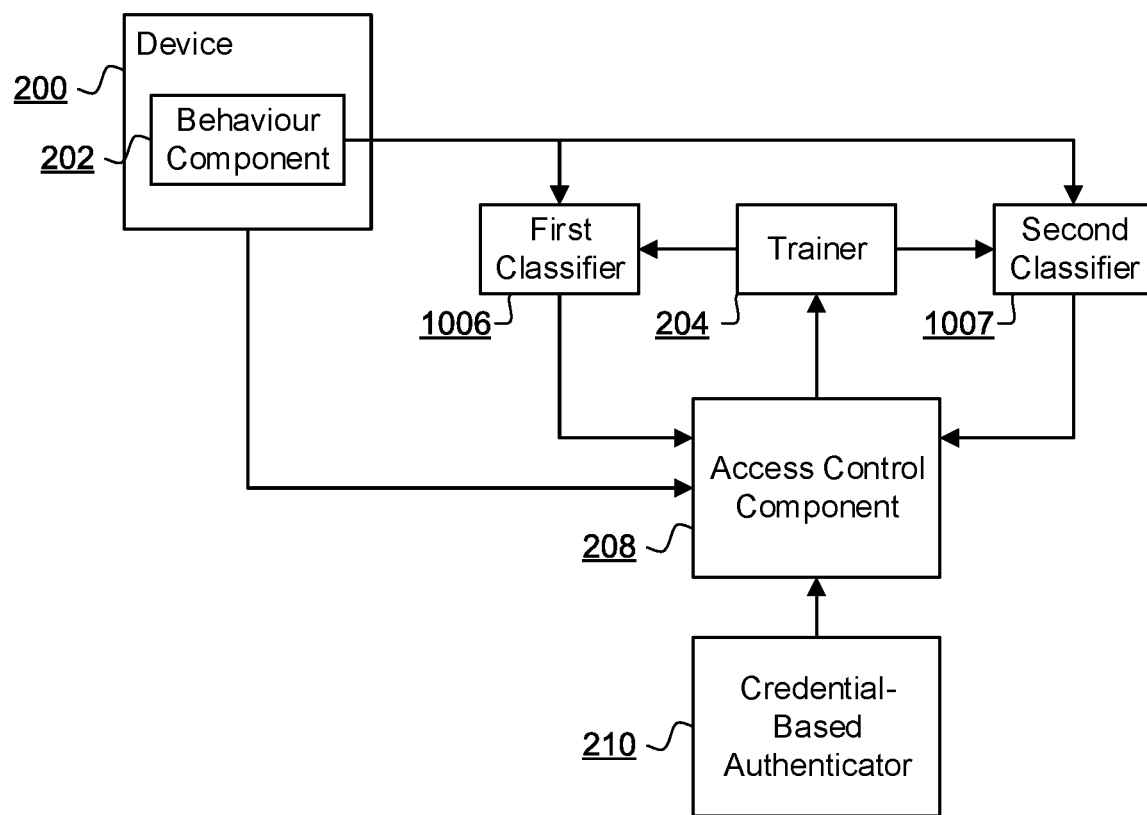
FIG. 10 is a component diagram of an arrangement for multi-classifier access control for a user device according to an embodiment of the present disclosure.

FIG. 10 is a component diagram of an arrangement for multi-classifier access control for a user device 200 according to an embodiment of the present disclosure. Many of the elements of FIG. 10 are identical to those described above with respect to FIGS. 2, 4, 6 and 8 and these will not be repeated here. FIG. 10 includes a pair of classifiers—a first classifier 1006 and a second classifier 1007, each of which is substantially consistent with the classifiers as hereinbefore described. The first and second classifiers 1006, 1007 of FIG. 10 are used to provide a multi-level classification scheme of user behavior such that atypical behavior that is classified as non-compliant by the first classifier 1006 can be processed by the second classifier 1007 to determine if such atypical behavior is nonetheless typical for the user of non-compliant behavior according to the first classifier 1006. Such an approach is particularly beneficial where the device 200 transitions between two distinct contexts such as: a primary context in which the device is primarily used and in which user behavior is modeled by the first classifier 1006 as most typical or prevalent behavior; and a secondary context in which the device is occasionally used an in which user behavior is modeled by the second classifier 1007. Such different contexts are widely experienced in real use-cases, with examples including: a secondary context in which the device 200 is used in an aircraft or other vehicle that is occasional and can restrict, constrain or otherwise affect user behavior due to, for example, constraints of space or usage permission; a secondary context in which the device 200 is occasionally used in different environmental conditions such as in the dark, at night, in a sunny location or the like, such that user behavior is affected due to, for example, a need to operate the device differently to provide illumination or avoid glare or the like; a secondary context in which the device is put to a different use-case such as, for example, an everyday device being used as a presentation device for sharing content with a group in which case the device may be handled, operated or otherwise used differently exhibited by differing behaviors; and other such secondary contexts in which behaviors occasionally differ from a primary context as will be apparent to those skilled in the art. Notably, the exact nature, cause and type of such distinction between a primary and secondary context are not important to embodiments of the present disclosure which are arranged to learn classification schemes and model behavior in contexts irrespective of the nature or cause.

Thus, in the arrangement of FIG. 10, the first classifier 1006 operates substantially as previously described with respect to FIG. 2 to classify user behavior to determine compliance or non-compliance as a basis for access control for the device 200. The second classifier 1007 provides a secondary classification scheme for behaviors that are classified non-compliant by the first classifier 1006 but where a user otherwise successfully authenticates using a credential-based authentication scheme. The second classifier 1007 is therefore trained based on training examples arising from behaviors found non-compliant by the first classifier 1006 so as to classify such behaviors as compliant or non-compliant with typical behaviors in a secondary user context. In embodiments, such behaviors found to be non-compliant by the first classifier 1006 but authenticated by the credential-based authenticator 210 are not used as training examples for the first classifier 1006 to provide a distance between the two classifiers 1006, 1007 allowing each classifier to specialize in their respective user contexts. In contrast, behaviors leading to a complete failure to authenticate by classification as non-compliant by both the first and second classifiers 1006, 1007 and a failure to authenticate by credential-based authentication can be used as training examples for both classifiers 1006, 1007 since such behaviors are indicative of non-compliant user behavior in both primary and secondary user contexts and for which device access should be prevented.

Figure 11:
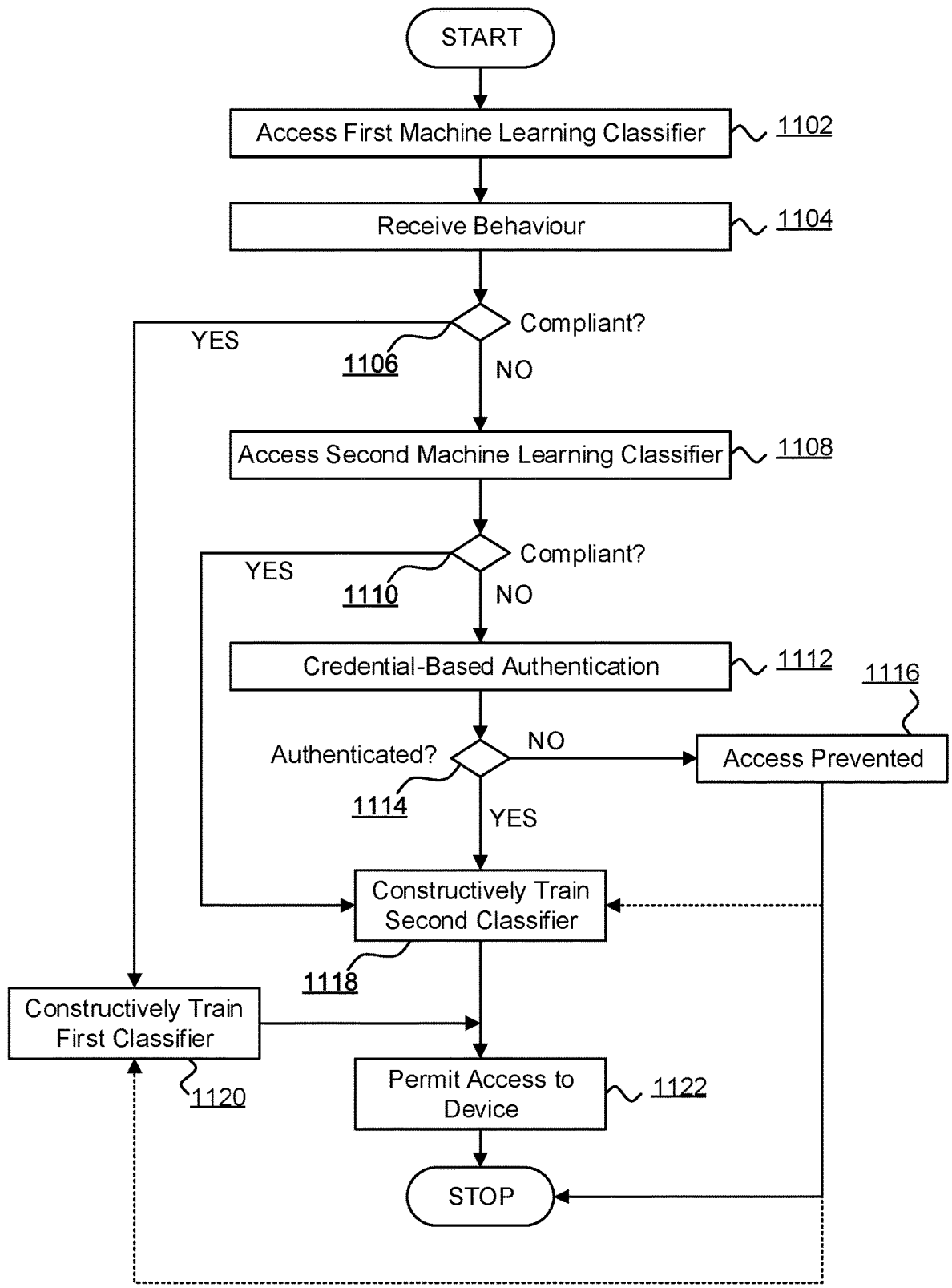
FIG. 11 is a flowchart of a method of access control for the embodiment of FIG. 10 in accordance with an embodiment of the present disclosure.

FIG. 11 is a flowchart of a method of access control for the embodiment of FIG. 10 in accordance with an embodiment of the present disclosure. Initially, at 1102, the method accesses the first machine learning classifier 1006 and receives a user behavior at 1104. The first classifier 1006 classifies the received behavior and where the behavior is classified as compliant at 1106 the method proceeds to 1120 where the first classifier is constructively trained using the behavior and compliant status as a new training example. Following constructive training at 1120, access to the device is provided to the user at 1122.

Where the behavior is determined at 1106 to be non-compliant based on the first classifier 1006, the method proceeds to 1108. At 1108 the second classifier 1007 is accessed and the behavior is classified according to the second classifier 1007. Where the behavior is classified as compliant by the second classifier 1007 at 1110 the method proceeds to 1118 where the second classifier 1007 is constructively trained using the behavior and compliant status as a new training example. Following constructive training at 1118, access to the device is provided to the user at 1122.

Where the behavior is determined at 1110 to be non-compliant based on the second classifier 1007, the method proceeds to 1112 where a credential-based authentication scheme is employed to authenticate the user. If the user is successfully authenticated using the credential-based authentication scheme at 1114, the method proceeds to 1118 which as been previously described. If the user is not successfully authenticated using the credential-based authentication scheme at 1114, the method proceeds to 1116 where access to the device 200 is prevented. Notably, on failure to authenticate by the credential-based authentication scheme, the behavior and it's status as non-compliant in both the first and second classifiers 1006, 1007 can be used to constructively train either or both classifiers 1006, 1007 to improve the suitability of the classifiers 1006, 1007 to classify non-compliance effectively. This is indicated by the logical flows in FIG. 11 depicted by broken lines.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the disclosure is not limited thereto and that there are many possible variations and modifications which fall within the scope of the present disclosure.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of access control for a user device having at least one component for determining behaviors of a user of the user device, the method comprising:

accessing a first machine learning classifier trained based on at least one prior behavior of the user using the user device, the first machine learning classifier classifying user behavior as compliant or non-compliant such that compliant behavior is determined by the first machine learning classifier to be consistent with prior behavior for permitting access to the user device; and responsive to a determination by the first machine learning classifier that a subsequent behavior is classified as non-compliant, accessing a second machine learning classifier trained based on at least one prior behavior of the user using the user device where the prior behavior is classified as non-compliant by the first machine learning classifier, the second machine learning classifier classifying user behavior as compliant or non-compliant such that compliant behavior is determined by the second machine learning classifier to be consistent with prior behavior for permitting access to the user device in the event of non-compliant classification by the first machine learning classifier, and further responsive to the determination:

responsive to a determination that the subsequent behavior is classified as non-compliant by the second machine learning classifier:

requesting a credential-based authentication of the user;

constructively training the second machine learning classifier based on the subsequent behavior and a result of the credential-based authentication by providing the subsequent behavior as a training example for the second machine learning classifier; and permitting access to the user device in response to the credential-based authentication; and responsive to a determination that the subsequent behavior is classified by the first machine learning classifier as compliant, constructively training the first machine learning classifier based on the subsequent behavior as a compliant behavior by providing the subsequent behavior as a training example for the first machine learning classifier.

2. The method of claim 1, further comprising, responsive to a determination that the subsequent behavior is classified by the first machine learning classifier as non-compliant, constructively training the first machine learning classifier based on the subsequent behavior as a non-compliant behavior by providing the subsequent behavior as a training example for the first machine learning classifier.

3. The method of claim 1, wherein the component is one or more of: a location sensor; a position sensor; an orientation sensor; an accelerometer; an input device; a touchscreen; a temperature sensor; a time determiner; a pressure sensor; an olfactory sensor; a chemical sensor; a biometric sensor; a heart rate sensor; a cardiogram generator; a sound sensor; a voice recognition component; a handwriting recognition component; a global positioning system; and a gyroscope.

4. The method of claim 1, wherein the credential-based authentication includes one or more of: an authentication scheme using a user identifier and password; a key-based user authentication scheme; a token-based user authentication scheme; and a multi-factor authentication scheme in which authentication is requested via a different device.

5. A computer system comprising:
a processor; and
a memory storing computer program code for performing a method of access control for a user device having at least one component for determining behaviors of a user of the user device, the method comprising:

accessing a first machine learning classifier trained based on at least one prior behavior of the user using the user device, the first machine learning classifier classifying user behavior as compliant or non-compliant such that compliant behavior is determined by the first machine learning classifier to be consistent with prior behavior for permitting access to the user device; and responsive to a determination by the first machine learning classifier that a subsequent behavior is classified as non-compliant, accessing a second machine learning classifier trained based on at least one prior behavior of the user using the user device where the prior behavior is classified as non-compliant by the first machine learning classifier, the second machine learning classifier classifying user behavior as compliant or non-compliant such that compliant behavior is determined by the second machine learning classifier to be consistent with prior behavior for permitting access to the user device in the event of non-compliant classification by the first machine learning classifier, and further responsive to the determination:

responsive to a determination that the subsequent behavior is classified as non-compliant by the second machine learning classifier:

requesting a credential-based authentication of the user;

constructively training the second machine learning classifier based on the subsequent behavior and a result of the credential-based authentication by providing the subsequent behavior as a training example for the second machine learning classifier; and permitting access to the user device in response to the credential-based authentication; and responsive to a determination that the subsequent behavior is classified by the first machine learning classifier as compliant, constructively training the first machine learning classifier based on the subsequent behavior as a compliant behavior by providing the subsequent behavior as a training example for the first machine learning classifier.

6. A non-transitory computer-readable storage medium comprising computer program code to, when loaded into a computer system and executed thereon, cause the computer system to perform a method of access control for a user device having at least one component for determining behaviors of a user of the user device, the method comprising:

accessing a first machine learning classifier trained based on at least one prior behavior of the user using the user device, the first machine learning classifier classifying user behavior as compliant or non-compliant such that compliant behavior is determined by the first machine learning classifier to be consistent with prior behavior for permitting access to the user device; and responsive to a determination by the first machine learning classifier that a subsequent behavior is classified as non-compliant, accessing a second machine learning classifier trained based on at least one prior behavior of the user using the user device where the prior behavior is classified as non-compliant by the first machine learning classifier, the second machine learning classifier classifying user behavior as compliant or non-compliant such that compliant behavior is determined by the second machine learning classifier to be consistent with prior behavior for permitting access to the user device in the event of non-compliant classification by the first machine learning classifier, and further responsive to the determination:

responsive to a determination that the subsequent behavior is classified as non-compliant by the second machine learning classifier:

requesting a credential-based authentication of the user;

constructively training the second machine learning classifier based on the subsequent behavior and a result of the credential-based authentication by providing the subsequent behavior as a training example for the second machine learning classifier; and
permitting access to the user device in response to the credential-based authentication; and responsive to a determination that the subsequent behavior is classified by the first machine learning classifier as compliant, constructively training the first machine learning classifier based on the subsequent behavior as a compliant behavior by providing the subsequent behavior as a training example for the first machine learning classifier.

\* \* \* \* \*